United States Patent [19]

Cromeens

[11] 3,942,233

[45] Mar. 9, 1976

[54] APPARATUS FOR ASSEMBLING FINGER JOINTED LUMBER

[75] Inventor: Jeff Y. Cromeens, Mesquite, Tex.

[73] Assignee: Industrial Woodworking Machine Co., Inc., Garland, Tex.

[22] Filed: Oct. 15, 1974

[21] Appl. No.: 514,457

[52] U.S. Cl. ............... 29/200 R; 144/3 E; 156/304; 156/558

[51] Int. Cl.[2] ........................................ B23P 19/00

[58] Field of Search ........... 29/200 R, 200 P, 200 B; 156/304, 558; 144/309 L, 3 D, 3 E, 3 M

[56] References Cited

UNITED STATES PATENTS

| | | | |
|---|---|---|---|
| 2,908,600 | 10/1959 | Nicholson | 156/304 X |
| 3,126,308 | 3/1964 | Brockerman et al. | 156/304 X |
| 3,179,135 | 4/1965 | Windsor | 156/558 X |
| 3,358,721 | 12/1967 | Giesecke et al. | 156/304 X |
| 3,388,020 | 6/1968 | Gates | 156/304 X |
| 3,790,427 | 2/1974 | Marstrand | 156/304 X |

*Primary Examiner*—Victor A. DiPalma
*Attorney, Agent, or Firm*—Joseph H. Schley; Thomas L. Cantrell

[57] ABSTRACT

A pair of torque driven pneumatic tires serially feeds pre-assembled finger jointed boards, aligned end to end, along a path with sufficient force to overcome a drag force imparted to the boards at a point disposed in the longitudinal direction of travel. The drag force is produced by a retarding unit positioned downstream of the tires for engaging opposite surfaces of the boards passing therethrough with conforming bearing surfaces and producing uniform normal forces and friction thereupon. The boards along the path between the points of feed and drag are thus subjected to longitudinal compression facilitating complete interengagement in the finger joint.

6 Claims, 5 Drawing Figures

APPARATUS FOR ASSEMBLING FINGER JOINTED LUMBER

BACKGROUND OF THE INVENTION

1. Field of Invention

The present invention relates to an apparatus for producing finger jointed lumber and, more particularly, to an apparatus for applying longitudinal compression to pairs of interlockable rigid wood elements aligned end to end to form a completed finger joint therebetween.

2. Description of the Prior Art

Apparatus for applying end pressure to pairs of boards having finger jointed, or aligned serrated ends, is in more or less common use for the production of finger jointed lumber. Generally, the surfaces of the finger joints are coated with glue or other adhesive and then mated together by hand. The finger jointed boards are then conveyed through apparatus which apply longitudinally compressive forces to the boards, sufficient to facilitate complete interengagement in the joint.

Heretofore finger jointing apparatus has generally comprised coacting pairs of drive and holdback units positioned for the engagement of preassembled finger jointed lumber by each. Such units have utilized torque driven rollers formed of solid resilient material and arranged in pairs to provide the drive and holdback functions. A differential in the speed of rotation between first and second pairs of rollers produced longitudinal compression in the lumber conveyed therebetween as the first set of drive rollers conveys the lumber at a speed greater than the second set of drive rollers will allow.

Drive and holdback units have also included combinations of rollers and pressure plates. In such arrangements, the rollers are mounted in the apparatus ingress portion to serially feed successive boards under a retractably mounted rigid bearing plate functioning much like a brake shoe to exert a retarding force to the boards. Such apparatus, though effective in assembling finger jointed boards, is limited in operation. Solid rollers have a single resiliency factor and often tend to crush small boards. Rigid drag plates cannot automatically adjust for variations in material thickness or material curvature. When drive and holdback rollers are used in combination the distance between the tangential engagement points may be determinitive of the minimum board length conveyed therethrough, generally longer than 8 inches. In such apparatus, variations in the shape of successively fed boards of minimum length often result in misalignment and joint failures. Thus, the lumber length, uniformity and shape become limitations in the operation of the above apparatus.

It is inherent in the woodworking industry to create boards of lengths less than 8 inches during cutting and trimming operations, as well as boards which vary in shape and thickness. Such lumber could otherwise form feed stock for conventional finger jointing mechanisms were the apparatus available which could handle their size and dimensional variations. With the growing shortage of lumber in the world, the need has been fostered for making use of such scrap material. This need, as well as the requirements of conservation and economy, has necessitated the creation of new and improved apparatus to form finger jointed lumber.

SUMMARY OF THE INVENTION

One object of the present invention is to provide a new and improved apparatus for producing finger jointed lumber out of material which is too short in length for conventional apparatus.

Another object of the present invention is to provide a new and improved apparatus for assembling finger jointed lumber from non-uniformly shaped boards.

It is a further object of the present invention to provide a new and improved apparatus for applying longitudinal compression to finger jointed boards.

It is yet a further object of the present invention to provide a new and improved apparatus for engaging finger jointed boards conveyed along a path and imparting a uniform normal pressure and frictional resistance thereto.

A new and improved apparatus for assembling finger jointed lumber in accordance with the principles of the present invention, includes a platform for receiving boards in end-to-end alignment for lengthwise travel thereon, first and second pneumatic tires rotatably mounted at an infeed portion of the platform and means for driving the tires to impart lengthwise movement serially to the material. A retarding means is positioned downstream of the tires for serially engaging the material and applying a uniform normal pressure and frictional resistance thereto and producing longitudinal compression therein.

Mated finger jointed boards are fed through the single pair of torque driven pneumatic tires which function as drive rollers to impart a driving force advancing the boards along a straight path. In place of a conventional second pair of retarding drive rollers, to resist the lengthwise movement of the boards, the retarding means comprises a pair of interacting drag heads disposed on opposite sides of the path of travel. Each drag head includes an expandable pressure vessel positioned to resiliently urge a flexible drag plate having a smooth bearing surface toward the other drag plate. This interaction produces the selected normal pressure and resultant drag force upon the boards retarding their movement. Such a device may be positioned at a point relatively close to and downstream of the tangential point of contact of the drive rollers. The flexibility of the drag plates ensures conformance of the bearing surface to variations in the material thickness and shape, and the position of the plates facilitates the handling of shorter lengths of finger jointed material.

The drive rollers are mounted at the ingress portion of the platform with the lower roller contact surface flush with the surface of the platform and the path of travel of the boards. The opposite surfaces of the boards are engaged by the rollers so as to rectilinearly transfer the boards from between the rollers to and across the surface of the platform. Because the rollers are air filled, their resiliency may be varied for imparting the desired normal force to the boards therebetween. For smaller, softer board material the tire pressure may be reduced to the minimum level necessary for positively gripping the material.

A guide may be pivotally mounted on the platform and positioned adjacent the infeed portion of the drive rollers for aligning and positioning the finger jointed material. The guide provides a reference surface for alignment across the joint and establishes the initial path of lengthwise travel. Pivotal mounting of the guide permits deflection thereof in response to lateral movement of the rearward end of a finger jointed piece of lumber imparted by the drive rollers when the forward end abuts a non-squared end of a board between the points of feed and drag. Movement of the guide, when the lumber end bears against it, alleviates the creation of a bending moment across the finger joint which could cause separation therein.

The present invention facilitates the assembly of the short pieces of lumber in various forms. The boards may be finger jointed on both ends and conveyed in contiguous end-to-end alignment to produce a desired finished length or finger jointed on one end only and mated in pairs to provide feed stock of adequate length for conventional apparatus. The invention accommodates varying shapes and dimensional configurations of finger joint material and is functional under a wide range of tolerances. Such boards which would otherwise be scrap material may thus be used to produce finger jointed lumber, facilitating maximum utilization of raw finger jointed material.

DESCRIPTION OF THE DRAWINGS

The objects and various features of the present invention will be understood from the following detailed description of a preferred embodiment thereof, when read in conjunction with the accompanying drawings, wherein.

DETAILED DESCRIPTION

Figure 1:
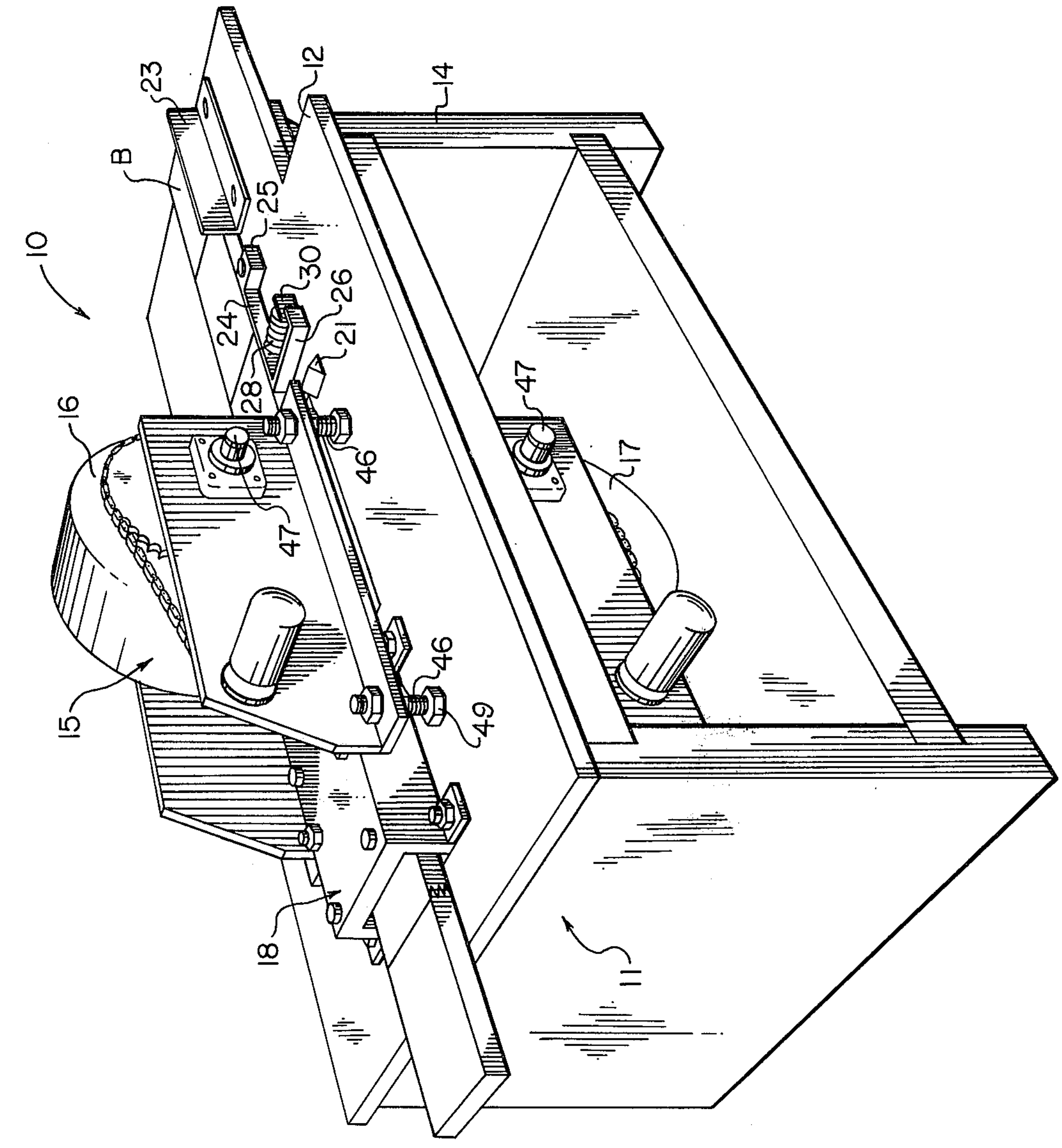
FIG. 1 is a perspective view of an apparatus embodying the principles of the present invention showing finger jointed boards passing therethrough.

Attention is first directed to FIG. 1, wherein a finger jointing apparatus or crowder 10 for assembling finger jointed lumber includes a table or platform 11 for receiving finger jointed material, such as timbers or boards B, positioned thereon in end-to-end alignment for lengthwise travel. The platform 11 includes a horizontal surface 12 secured to and supported by an upright base 14. A drive unit 15 for imparting a driving force to advance successively fed boards B, comprises upper and lower pneumatic tires 16 and 17, respectively, rotatably mounted about horizontal axes upon the platform 11, in parallel axial alignment. A retarding unit 18 for resisting the conveyance of the boards B is mounted upon the platform 11, downstream of and adjacent to the drive unit 15 for receiving the lengthwise travel of the boards B therethrough.

Figure 2:
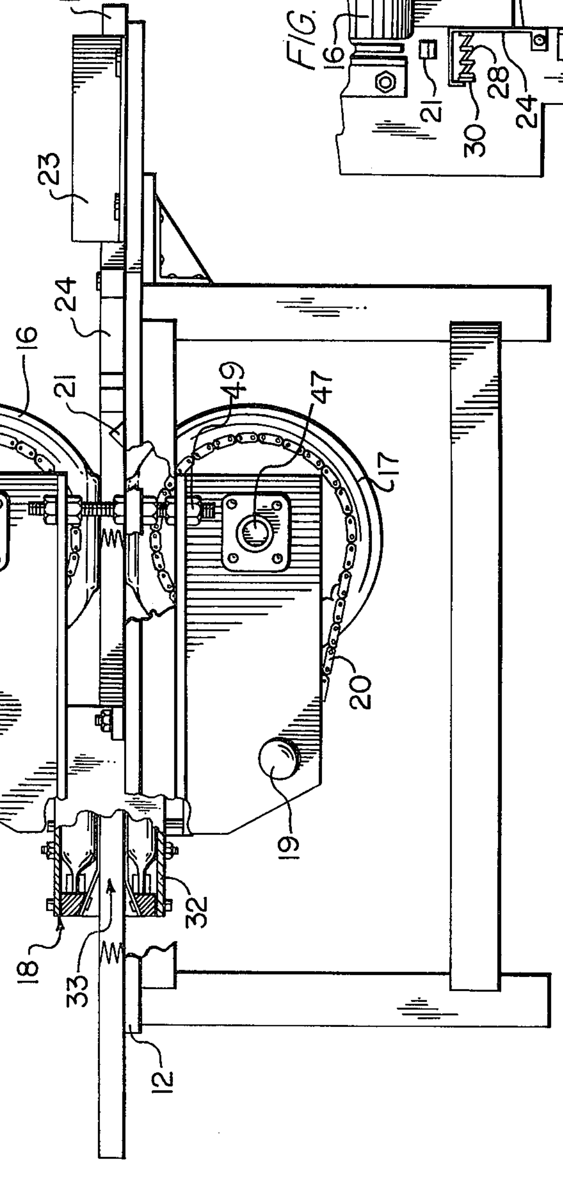
FIG. 2 is a side elevational view of the apparatus of FIG. 1, with parts broken away for purposes of illustration.

As shown most clearly in FIG. 2, drive unit 15 is positioned at the ingress or posterior portion of the crowder 10 with the tires 16 and 17 spaced apart a distance substantially less than the width of the boards B. This tire spacing is adjustable for positively gripping the boards. As shown in the present embodiment, the tires 16 and 17 are of the air-inflatable type, the air pressure of which may be varied to alter certain characteristics including the tire resiliency, as will be discussed in more detail below.

The tires 16 and 17 are each driven by a separate motor 19 imparting rotational force thereto by conventional torque transfer means, such as chain drive 20. The motors 19—19 provide torque for synchronous rotation of the tires 16 and 17 in opposite directions, transmitting sufficient drive force to the boards B therebetween for lengthwise movement. The motor speed is adjustable for varying the conveyance speed of the boards B.

Motors 19—19 are actuated through a device disposed adjacent the infeed area of the drive unit 15 for sensing the positioning of finger joint material for advancement. The device may be positioned immediately behind the initial point of engagement of the tires 16 and 17 with the finger joint material, and include a conventional coupling of a photoreceptor 21 and a light source 22 for actuating the motors 19—19. The operation of drive unit 15 is thus begun by the presence of boards B and the operation ceases when successive boards are not in position for advancement. By positioning the sensing device in this manner, the operation stops with the posterior end of the board B projecting out from between the tires 16 and 17 a sufficient distance for engagement by a successively fed board. Such an arrangement maintains constant longitudinal pressure in the material between the points of feed and drag at all times.

Figure 4:
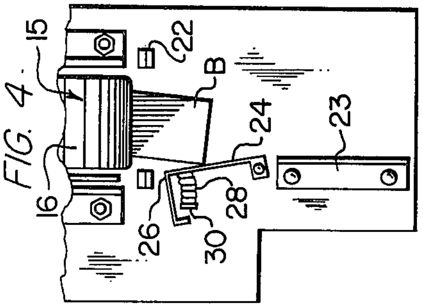
FIG. 4 is the same view as FIG. 3 illustrating the pivoting of the guide member to facilitate lateral deflection of finger jointed lumber when non-squared ends abut.
Figure 3:
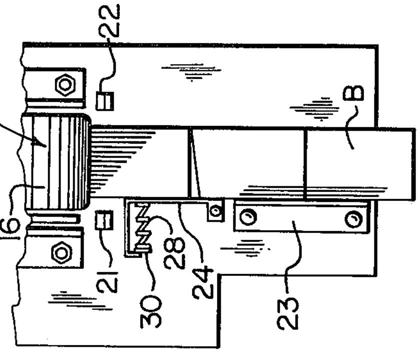
FIG. 3 is a fragmentary top plan view of the infeed portion of the apparatus of FIG. 1, illustrating the feeding of successive pairs of finger jointed boards.

The advance of the finger joint material through the drive unit 15 is initiated by introducing the boards B in end-to-end contiguous alignment at the infeed portion of the platform 11. Because of variations in the shape of the boards B and/or non-squareness of their ends, successive pairs may not initially abut in uniform engagement across the end surfaces, as shown most clearly in FIG. 3. When drive force is imparted by the tires 16 and 17 a bending moment may be created across the abutting surfaces tending to laterally deflect the boards. As shown in FIG. 4, the ingressing board B may attempt to realign itself by deflecting laterally. Such movement can cause separation in the finger joint if one of the boards is not permitted to move in an unrestricted manner.

Elongated guide members including a lead rail 23 and a fence 24 may be positioned at the infeed portion of the platform 11 on one side of the path of travel for aligning the finger joint material and facilitating possible lateral deflection thereof. Rail 23 and the fence 24 are formed of suitably rigid material, have flat, straight edges for slidable engagement with the edges or sides of the boards B and initially establish a direction and path of lengthwise movement therefor. Rail 23 is rigidly mounted at the outermost section of the infeed portion of platform 11 with the fence 24 positioned inwardly thereof. The fence 24 is pivotally mounted at a posterior end 25 distant from the drive unit 15. An anterior end 26, of the fence 24, adjacent the drive unit, is resiliently coupled thereto by a compression spring 28. The end 26 is formed to engage the spring 28 and a stop 30 and coupled thereto for continually urging the fence 24 into the alignment position. Spring 28 has a relatively low spring constant so that relatively light lateral pressure along the fence 24 will cause it to pivot away from the path, as shown most clearly in FIG. 4. Boards B are thereby permitted to realign to facilitate non-uniformity and non-squareness in shape. The term lengthwise movement or travel as used herein includes this realigned but substantially lengthwise, transverse movement of the boards B.

Figure 5:
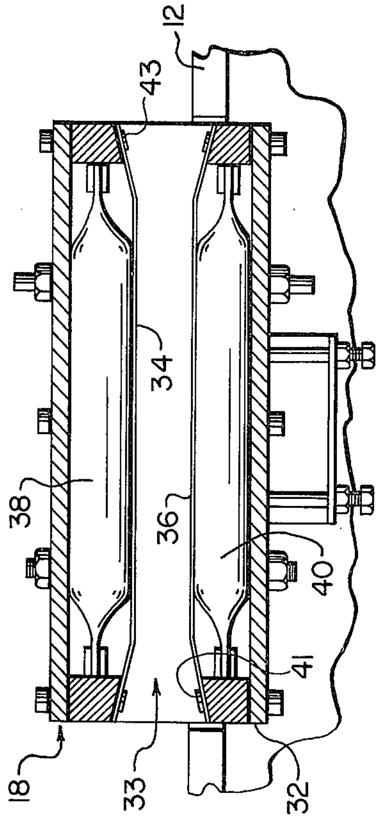
FIG. 5 is an enlarged vertical-sectional view of a retarding unit in the apparatus of FIG. 1, illustrating various details therein.

Referring again to FIGS. 2 and 5, the retarding unit 18 is positioned in close proximity to the tangential drive point of tires 16 and 17 to provide an immediate resistive force to the boards B passing therebetween. Retarding unit 18 includes an elongate housing or frame 32 having a lengthwise passageway 33 therethrough. Upper and lower drag plates 34 and 36 are supported within the frame 32 and retractably mounted on opposite sides of the passageway 33 in parallel spaced relationship. Pressure responsive means, comprising upper and lower pressure vessels 38 and 40, engage the plates 34 and 36 in coextensive overlying and underlying relationship, respectively. The pressure vessels 38 and 40 are formed of suitable elastic material into which a pressurized fluid, such as air, may be introduced or expelled to inflate or deflate them. Inflation apparatus, not shown, is provided to supply and monitor the vessels 38 and 40 with pressure fluid. Upon inflation of the vessels 38 and 40 the drag plates are resiliently urged toward each other and into contact with material therebetween. The compressive forces imparted and frictional resistance created are proportional to the selected inflation pressure.

The frame 32 is mounted on the anterior portion of the platform 11, across and downstream of the path of the boards B with the passageway 33 aligned with the path for the lengthwise travel of boards B therethrough. Drag plates 34 and 36 are formed of flexible material, such as spring steel or the like, having a hard, smooth bearing surface and sufficient flexibility to conform to the shape or thickness variations in the material therebetween and apply uniform normal pressure thereto. The plates 34 and 36 are mounted in the frame 32 in parallel spaced relationship and are supported at opposite ends in a manner providing for the emerging and retracting of the plates into and from the path of travel during inflation and deflation of the vessels 38 and 40. Preferably, the plate end margins have slots formed therein for receiving threaded fasteners, such as screws 41 and 43, therethrough. The screws 41 and 43 secure the plate end margins to the frame 32 while permitting lateral deflection of the central portions of the plates 34 and 36 therebetween. This dual drag plate design creates a "floating" effect in the retarding unit 18 in that the boards B are not pressed against a rigid surface. Such a design accommodates longitudinal curvature often present in the boards by permitting some degree of self-imparted board positioning in the retarding unit 18.

During operation of the crowder 10, the material B between the drive unit 15 and the retarding unit 18 undergoes a "crowding" effect. This crowding is the result of the longitudinal compression of the finger jointed material produced by the force imparted by tires 16 and 17 and resisted by the dual drag plates 34 and 36.

As shown in FIGS. 1 and 2, the elongate housing or frame 32 of the retarding unit is rectangular and of much greater length than height or width in order to accommodate the elongate drag plates and pressure vessels, said height or vertical dimension being less than the distance between the axes of rotation of the tires 16, 17. Since the longitudinal passageway 33 of the housing is aligned with the path of lengthwise travel of the boards and since the drag plates 34, 36 are mounted in said housing or frame for movement into and out of said path of travel upon inflation and deflation of the substantially coextensive pressure vessels 38, 40, said housing has its lower portion (including lower pressure vessel 40) depending below the top or upper surface 12 of the platform or table 11 and its upper portion projecting above said table top. As a result, the aforesaid positioning of the retarding unit 18 in close proximity to the tangential drive point of the tires is facilitated and the upstream ends of the drag plates may be closely adjacent or contiguous said tangential drive point of said tires, thereby permitting the assembling of finger jointed boards of less length than 8 inches.

Various parameters determine the magnitude of the crowding forces, and these parameters may be selectively adjusted for the finger joint material being joined. The distance between the tires 16 and 17 determines, in part, the magnitude of normal force applied to the boards B and the resulting amount of frictional engagement. The magnitude of the driving force which may thus be imparted is limited by this frictional engagement. As shown in FIGS. 1 and 2, the distance between the tires 16 and 17 is adjustable through the tire mounting means comprising upright threaded rods 46—46 extending vertically through the surface 12 to position and secure mounting axles or shafts 47—47 having the tires mounted thereon. Suitable nuts 49—49 are threaded onto the rods 46—46 to secure the tires 16 and 17 relative to one another and to the surface 12.

For adjusting the normal force imparted by the tires 16 and 17 to the material passing therebetween the pressure in the tires may be varied. The shafts 47—47 are hollow and perforated in the area of the tire mounting for this purpose. Air may be supplied through the shafts 47—47 and monitored to the tires 16 and 17 during operation by suitable inflation and monitoring apparatus (not shown). When material is conveyed therebetween, the tires 16 and 17 are positioned with their contiguous peripheral portions engaging relatively large surface areas of the boards B as shown in FIG. 2. The enlarged gripping surface provides traction and the capability of conveying material with predetermined compressive forces.

The above described apparatus is capable of delivering to pairs of finger jointed boards sufficient finger joint pressure for complete interengagement. Unlike conventional finger jointing apparatus, the single pair of pneumatic drive rollers in conjunction with the floating drag plates facilitate the joining of short lengths of boards which would otherwise be scrap. Finger jointed boards may thus be conveyed in pairs or in continuous end-to-end alignment facilitating the finger jointing of otherwise unusable material.

It is believed that the operation and construction of the above described invention will be apparent from the foregoing description. While the particular embodiment shown and described has been characterized as being preferred, it will be obvious that various changes and modifications may be made therein without departing from the spirit and scope of the invention as defined in the following claims.

What is claimed is:

1. An apparatus for assembling finger jointed lumber from a pair of boards of short lengths, having finger joint grooves formed in their adjacent end faces and in partially interlocked engagement, comprising a platform for receiving the and supporting a pair of boards of short lengths in end-to-end alignment for lengthwise travel thereon;

first and second pneumatic tires;

means for rotatably mounting said tires at an infeed portion of said platform thereabove and therebelow for engaging the boards therebetween;

means for driving said tires to impart movement serially to said pair of boards for conveying them along said platform;

retarding means immediately downstream of and in close proximity to said tires for serially engaging said pair of boards and applying a uniform normal pressure and frictional resistance thereto for retarding the lengthwise travel thereof and producing longitudinal compression and complete interengagement of said pair of finger jointed boards;

an elongate guide member at the infeed portion of said platform adjacently upstream of said tires and in alignment with one of the longitudinal margins of the path of lengthwise travel of said boards;

means pivotally attaching the upstream end of the guide member to said platform; and resilient means outwardly of said guide member for maintaining said member in its aligned position as well as permitting lateral outward pivoting thereof with the upstream end portion of the trailing board of said pair of boards when said upstream board end portion is out of alignment with said lengthwise travel path.

2. An apparatus for assembling finger jointed lumber from a pair of boards of short lengths, having finger joint grooves formed in their adjacent end faces and in partially interlocked engagement, comprising a platform for receiving and supporting a pair of boards in end-to-end alignment for lengthwise travel thereon;

first and second pneumatic tires;

means for rotatably mounting said tires at an infeed portion of said platform thereabove and therebelow for engaging the boards therebetween;

means for driving said tires to impart movement serially to said pair of boards for conveying them along said platform;

retarding means immediately downstream of and in close proximity to said tires for serially engaging said pair of boards and applying a uniform normal pressure and frictional resistance thereto for retarding the lengthwise travel thereof and producing longitudinal compression and complete interengagement of said pair of finger jointed boards;

said retarding means including frame means having a longitudinal passageway therethrough;

means mounting said frame on said platform with said passageway in alignment with said travel path of said pair of boards for receiving their lengthwise movement therethrough;

first and second drag plates extending longitudinally of said travel path;

means mounting said drag plates in said frame means above and below said travel path for selective engagement with the upper and lower surfaces of said pair of boards; and pressure responsive means mounted in said frame means in operative engagement with said drag plates for resiliently urging said plates toward each other and into contact with the boards conveyed therebetween;

said frame means being of a height less than the radii of said tires whereby the upstream ends of said drag plates are closely adjacent the tangential drive point of said tires when said frame means is mounted in close proximity to said tires.

3. An apparatus for assembling finger jointed lumber from a pair of aligned boards of short lengths, having finger joint grooves in the adjacent end faces thereof and in partially interlocking engagement, including a substantially horizontal table for receiving and supporting a pair of boards in end-to-end alignment for lengthwise travel thereon, drive means at the infeed portion of the table for imparting longitudinal movement to the pair of boards, retarding means at the outfeed portion of said table for resisting the longitudinal movement of said pair of boards so as to produce lengthwise compression and complete interengagement of the adjacent end faces of said pair of boards;

the drive means comprising a pair of driven upper and lower pneumatic tires mounted for rotation about horizontal axes above and below said table and extending transversely of the lengthwise path of said pair of boards, the pneumatic tires having a common vertical plane of rotation aligned with said lengthwise travel path and the peripheries of said tires being in frictional engagement with the upper and lower surfaces of said boards;

the retarding means comprising a pair of upper and lower substantially horizontal braking elements above and below said table and elongated longitudinally of said lengthwise travel path of said pair of boards and in said vertical plane of rotation of said tires for frictional engagement with the upper and lower surfaces of said boards, pressure responsive means extending longitudinally of and in operative engagement with each braking element for resiliently urging the elements toward each other and against the upper and lower surfaces of said boards, and frame means for mounting said braking elements and pressure responsive means in downstream close proximity to the tangential drive point of said tires, whereby said braking elements apply resistive force to the upstream portion of the leading board when said tires engage the downstream portion of the trailing board of said pair of boards, the frame means having a vertical dimension less than the distance between the axes of rotation of said tires whereby the upstream ends of said braking elements are closely adjacent the aforesaid tangential drive point of said tires when the frame means is mounted in close proximity to said tires.

4. An apparatus as defined in claim 3 wherein the braking elements are flexible to permit conformation thereof to the contour of the upper and lower surfaces of the boards.

5. An apparatus as defined in claim 3 wherein each pressure responsive means comprises an elongated inflatable member, and fluid supply means communicating with the members for selectively inflating said members to urge the braking elements into engagement with the boards.

6. An apparatus as defined in claim 3 wherein each braking element comprises a flexible plate.

* * * * *